2,960,506
NEW ESTERS OF RESERPIC ACID ALKYL ESTERS

Johannes Mueller, Arlesheim, Switzerland, assignor to Ciba Pharmaceutical Products Inc., Summit, N.J.

No Drawing. Filed Feb. 25, 1959, Ser. No. 795,353

Claims priority, application Switzerland Apr. 3, 1958

3 Claims. (Cl. 260—286)

This invention provides the carbalkoxy-ferulic acid esters of reserpic acid alkyl esters of the formula

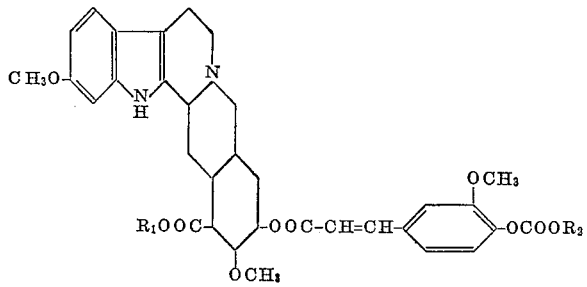

and salts thereof, in which $R_1$ represents an alkyl group containing 1–5 carbon atoms, especially the methyl radical, and $R_2$ stands for an alkyl group containing 1–5 carbon atoms, especially the ethyl radical.

The new esters, especially the carbethoxy-ferulic acid ester of reserpic acid methyl ester, have a strong capacity for lowering the blood pressure resembling that of reserpine, but they have little or no sedative or narcotic action. They are therefore useful as medicaments, if desired, in the form of a therapeutically useful salt thereof.

The new compounds can be made by methods in themselves known. Advantageously, a reserpic acid alkyl ester, the alkyl radical of which contains 1–5 carbon atoms, more especially reserpic acid methyl ester, is esterified with a carbalkoxy-ferulic acid, the alkoxy radical of which contains 1–5 carbon atoms more especially carbethoxy-ferulic acid. The esterification may be carried out in various ways. Advantageously, the reserpic acid ester is reacted with the carbalkoxy-ferulic acid in the form of a reactive functional acid derivative thereof, especially a halide, for example, the chloride, or the anhydride. Alternatively, the ferulic acid ester of a reserpic acid alkyl ester, especially reserpic acid methyl ester may be esterified with carbonic acid alkyl ester, especially carbonic acid methyl ester or a reactive functional derivative thereof, such as a chloro-formic acid alkyl ester.

The reaction is carried out in the usual manner, advantageously in the presence of a diluent and/or a condensing agent. When an acid halide is used it is of advantage to work in an anhydrous solvent in the presence of an acid-binding agent such as an alkali metal carbonate or alkaline earth metal carbonate, or a strong organic base such as a tertiary amine, especially pyridine.

Depending on the procedure used the new esters are obtained in the form of the free bases or salts thereof. From the salts the free bases may be liberated in the usual manner. The free bases may be converted in the usual manner into salts thereof, of which there may be mentioned more especially salts of hydrohalic acids, for example, hydrochloric acid, or sulfuric acid, phosphoric acid, nitric acid, perchloric acid, acetic acid, propionic acid, oxalic acid, citric acid, lactic acid, succinic acid, tartaric acid, malic acid, ascorbic acid, methane sulfonic acid, ethane sulfonic acid, oxyethane sulfonic acid, thiocyanic acid, benzoic acid, salicylic acid, para-aminobenzoic acid or toluene sulfonic acid.

The invention also includes a process in which there is used as starting material an intermediate material obtainable at any stage of the process, and the remaining process steps are carried out, or the process is interrupted at any stage. The reserpic acid alkyl esters may be used in their natural or racemic form, and the new ferulic acid esters are correspondingly obtained in their optically active or racemic forms.

The new esters and/or salts thereof can be used, for example, in the form of a pharmaceutical preparation which contains the ester and/or salt in admixture with a pharmaceutical organic or inorganic carrier suitable for enteral, parenteral or topical administration. For making the carrier there are used substances which do not react with the new compounds, for example, water, gelatine, lactose, starches, magnesium stearate, talc, vegetable oils, benzyl alcohols, gums, polyalkylene glycols, white petroleum jelly, cholesterol or other known carrier for medicaments. The pharmaceutical preparations may be, for example, in the form of tablets, dragees, or pearls, or in liquid form as solutions, suspensions or emulsions. If desired they may be sterilized and/or may contain auxiliary substances, such as preserving, stabilizing, wetting or emulsifying agents, salts for regulating the osmotic pressure, or buffers. They may also contain other therapeutically valuable substances.

The following examples illustrate the invention:

*Example 1*

9.7 grams of ferulic acid are dissolved in a solution of 4 grams of sodium hydroxide in 100 cc. of water, 6 grams of chloroformic acid ethyl ester are slowly added, while stirring, and the mixture is stirred for a further ½ hour. While cooling the mixture in an ice bath and stirring well, there is added a sufficient quantity of 2 N-hydrochloric acid (approximately 12 cc.) to give the solution a pH value of 7, the gum-like precipitate is removed by filtration, and the clear filtrate is rendered strongly acid with 5 cc. of concentrated hydrochloric acid, while cooling and stirring well. The carbethoxy-ferulic acid which crystallizes in the form of white crystals is filtered off with suction, the filter cake is washed with about 250 cc. of distilled water, and dried for several days in vacuo over phosphorus pentoxide. The crude acid melts at 151–156° C. and is subjected to the further treatment without purification.

4.7 grams of carbethoxy-ferulic acid are allowed to stand in 50 cc. of thionyl chloride for 5 hours at room temperature. The solution is evaporated to dryness in vacuo, the residue is dissolved in 50 cc. of benzene, and the solution is evaporated to dryness. This procedure is repeated twice.

The carbethoxy-ferulic acid chloride so obtained is introduced into an ice-cold solution of 1.8 grams of reserpic acid methyl ester in 100 cc. of pyridine, and the mixture is allowed to stand at 0° C. for 3 days. The whole is then agitated for 15 hours at room temperature, and it is filtered to remove a small amount of undissolved residue, 50 grams of ice are added to the solution, and the solution is evaporated to dryness. The residue is dissolved in 250 cc. of chloroform, the chloroform solution is washed with caustic soda solution of 2% strength and with water, then dried over anhydrous sodium sulfate, and evaporated to dryness in vacuo. The amorphous residue is dissolved in benzene, and absorbed on a column of 100 grams of aluminum oxide (activity II–III according to Brockmann, neutral). The column is eluted with 70 cc. of benzene, and then with about 1 liter of a mixture of 9 parts by volume of benzene and 1 part by volume of acetone, the eluate is evaporated to dryness in vacuo, and the residue is taken up in a small amount of a mixture of methanol and hexane (3:1). The carbethoxy-ferulic acid ester of reserpic acid methyl ester crystallizes overnight in the form of small colorless needles, which after recrystallization from methanol melt at 218–219° C. (in an evacuated capillary with a short stemmed thermometer). It has the optical rotation $[\alpha]_D^{22}$ (c.=0.694) —77 to 78°±4.

When instead of reserpic acid methyl ester a corresponding quantity of reserpic acid ethyl, propyl or butyl ester is used and the procedure is otherwise analogous to that described above, carbethoxy-ferulic acid ester of reserpic acid ethyl ester and carbethoxy-ferulic acid ester of reserpic acid propyl ester and carbethoxy-ferulic acid ester of reserpic acid butyl ester respectively are obtained.

When a quantity of chloroformic acid methyl, propyl or butyl ester is used as starting material corresponding to that of chloroformic acid ethyl ester and the procedure is analogous to that described above, carbomethoxy and carbopropoxy and carbobutoxy-ferulic acid ester of reserpic acid methyl ester respectively are obtained.

*Example 2*

10.08 grams of carbethoxy-ferulic acid are suspended in 26 cc. of thionyl chloride and boiled under reflux for 1½ hours with the exclusion of moisture. The solvent is removed under reduced pressure, the residue is dissolved repeatedly in 100 cc. of benzene and evaporated each time to dryness under reduced pressure. The resulting crude crystallisate is melted and rapidly distilled under reduced pressure. The acid chloride passes over in the course of 20 minutes at 224–230° C. under 0.7 mm. of pressure and solidifies to a colorless crystalline mass which can be distintegrated in hexane. After drying for several days over phosphorus pentoxide, 7.63 grams of carbethoxy-ferulic acid chloride melting at 73–75° C. are obtained.

4.5 grams of reserpic acid methyl ester are dissolved in 35 cc. of dry pyridine and cooled in an ice bath. 3.68 grams of pulverized carbethoxy-ferulic acid chloride are added in portions after further cooling, the flask is rinsed before being closed with nitrogen and the mixture is then agitated for about 20 minutes. When all the acid chloride is dissolved the mixture is allowed to stand for 15–20 hours at room temperature with the exclusion of light.

The resulting brown-red solution is added dropwise in the course of half an hour to 350 cc. of ice water and stirred for another half hour with cooling. The grainy precipitate is isolated by filtration.

By dissolving the residue in methylene chloride, adding methanol and slowly concentrating the solution, or by simply triturating the residue in methanol, 5.05 grams of ester are obtained as a crude crystallizate. By repeating this operation several times, a colorless crystalline powder is formed melting at 218–219° C. (in the evacuated capillary with a short stem thermometer) and having the optical rotation $[\alpha]_D^{27.3}$ (c.=0.9469) of —80.3°±1.6°.

What is claimed is:

1. The carbalkoxy-ferulic acid esters of reserpic acid alkyl esters of the formula

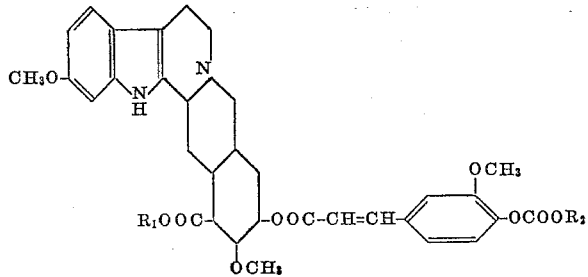

in which $R_1$ and $R_2$ stand for alkyl radicals having 1–5 carbon atoms, and therapeutically acceptable acid addition salts thereof.

2. The carbethoxy-ferulic acid ester of reserpic acid methyl ester.

3. The therapeutically acceptable acid addition salts of the compound claimed in claim 2.

References Cited in the file of this patent

UNITED STATES PATENTS 2,813,871    Lucas                Nov. 19, 1957
2,857,385    Kuehne             Oct. 21, 1958